United States Patent

[11] 3,621,291

[72] Inventor Ted Y. Fujimoto
Santa Ana, Calif.
[21] Appl. No. 70,352
[22] Filed Sept. 8, 1970
[45] Patented Nov. 16, 1971
[73] Assignee North American Rockwell Corporation

[54] NODABLE FIELD-EFFECT TRANSISTOR DRIVER AND RECEIVER CIRCUIT

5 Claims, 1 Drawing Fig.

[52] U.S. Cl. .................................................... 307/251,
307/205, 307/304, 307/279
[51] Int. Cl. .................................................... H03k 17/00
[50] Field of Search .......................................... 307/205,
221 C, 251, 279, 304, 208, 210

[56] References Cited

UNITED STATES PATENTS

| | | | |
|---|---|---|---|
| 3,322,974 | 5/1967 | Ahrons et al. ................ | 307/304 |
| 3,431,433 | 3/1969 | Ball et al. ...................... | 307/251 |
| 3,439,185 | 4/1969 | Gibson ........................ | 307/205 |
| 3,524,077 | 8/1970 | Kaufman ...................... | 307/251 |

OTHER REFERENCES

Kerins, American Micro-systems Inc., " Low Power Circuit Design Using "P" Channel MOS," Pages 186–187, Session 4B, Paper 4B.2, Advances in MOS Tech., copy in 307/251

*Primary Examiner*—Donald D. Forrer
*Assistant Examiner*—R. E. Hart
*Attorneys*—L. Lee Humphries, H. Frederick Hamann and Robert G. Rogers ABSTRACT: A field-effect transistor driver circuit using a feedback capacitor at the output stage unconditionally charges an output node at least during a first phase recurring clock signal and the input to the driver is evaluated during a second phase recurring clock signal so that the output is conditionally discharged as a function of the input. One or more drivers may be connected at a common output node for implementing a logic function.

A receiver pre-output node is precharged during the driver output precharge phase and the receiver output is precharged unconditionally during the driver evaluation phase. The common output node for the driver circuit is evaluated as an input to the receiver so that the receiver output is conditionally discharged as a function of the voltage at the common output node. After the receiver output has been evaluated, it is isolated until the next clock cycle.

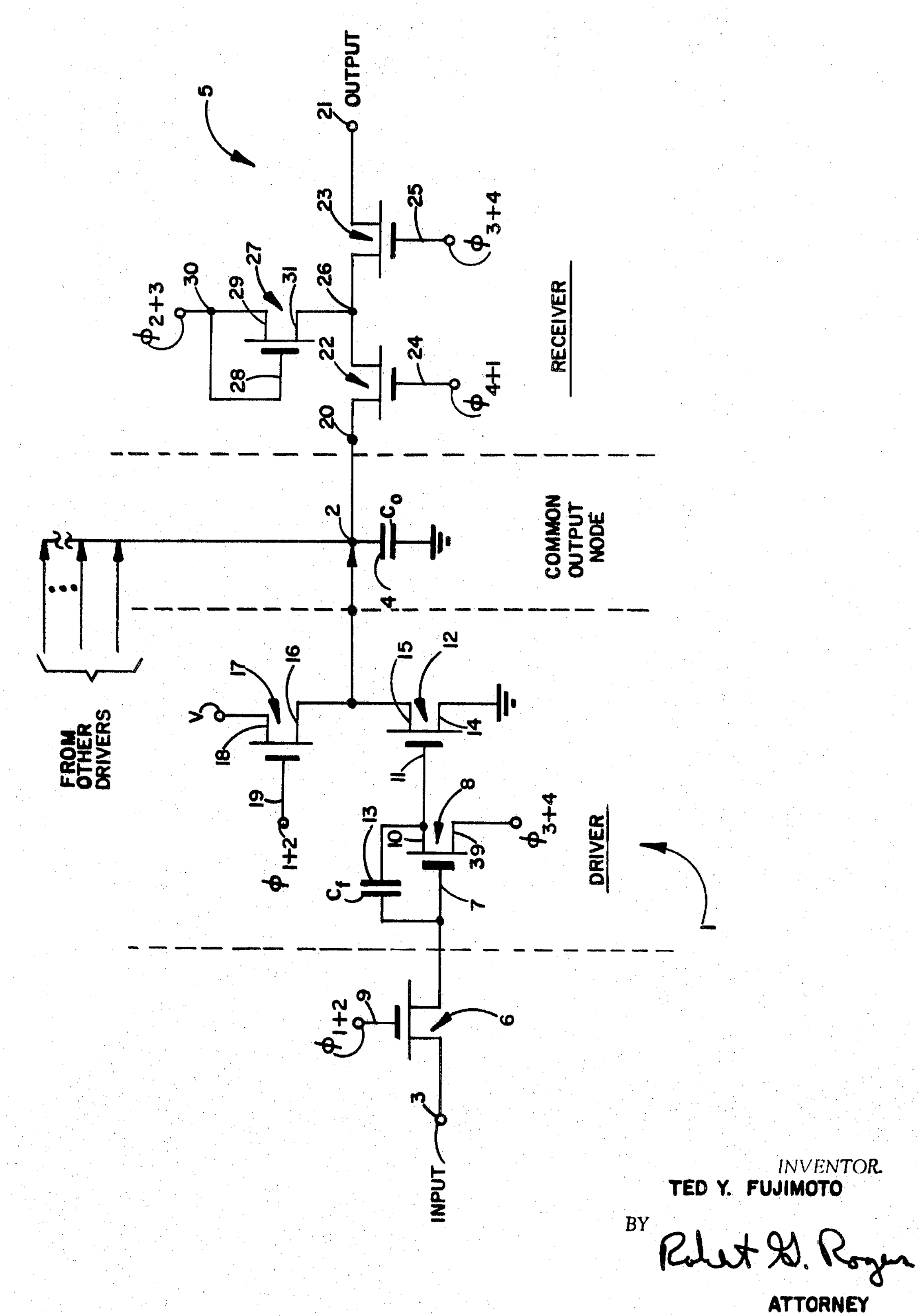
INVENTOR.
TED Y. FUJIMOTO
BY Robert G. Rogers
ATTORNEY

NODABLE FIELD-EFFECT TRANSISTOR DRIVER AND RECEIVER CIRCUIT

BACKGROUND OF THE INVENTION

1. Field of the Invention

The invention relates to a nodable field-effect transistor driver and receiver circuit operated in accordance with a multiphase clocking cycle and more particularly to such a circuit in which one or more drivers can be connected at a common output node for implementing a logic function and for providing an input to a receiver circuit after the driver inputs have been evaluated and the output of the receiver has been precharged.

2. Description of Prior Art

Certain microelectronic circuits require one or more driver circuits on one or more semiconductor chips for providing voltage levels as inputs to a receiver circuit on the same or on another semiconductor chip. The several drivers connected at a common output point, called a node, implement a logic function.

Usually such circuits require a driver circuit that can be operated at a relatively high speed with reasonably small-device size and relatively high-power drive capabilities. Ordinarily, when the size of a field-effect transistor is reduced, the power capability is also reduced. As the size is increased, the speed increases. In addition, as the number of drivers connected at a common node or point increases, the speed of the circuit combination is decreased.

A driver-receiver circuit combination is preferred which can satisfy system power and speed requirements within satisfactory size limitations. The present invention provides such a circuit combination for use with existing systems having at least major phase clock signals available. A major phase clock signal is understood to mean a clock signal having a true interval of at least two phases. For example, $\Phi_{1+2}$, $\Phi_{2+3}$, $\Phi_{3+4}$, and $\Phi_{4+1}$ clock signals are major, or double phase, clock signals.

SUMMARY OF THE INVENTION

Briefly, the invention comprises a nodable multiphase driver and receiver circuit implemented by field-effect transistors. In the preferred embodiment, one or more field-effect transistor drivers are connected at a common output node which provides an input to a receiver circuit. The drivers and receiver are ordinarily on different semiconductor chips.

If a plurality of drivers are connected at a common output node, a NOR gate logic function is implemented. Other types of logic functions such as OR, AND, NAND, etc. can also be implemented by the appropriate use of field-effect transistor circuitry.

During one-phase recurring clock signal, the common output node for the driver(s) which comprises the distributed inherent capacitance along the lines between the driver(s) and receiver circuits is precharged to a first voltage level. In the preferred embodiment, the receiver circuit is isolated from the common output node during the precharge phase.

Following the precharge phase, the input to the driver(s) is evaluated and the common output node is either discharged or remains charged as a function of the input to the driver(s). For example, in a NOR gate embodiment, if an input signal to a driver is true, the output common node is discharged to a voltage level representing a false state. In other words, a logical inversion occurs.

During the driver input evaluation phase, the receiver preoutput node is precharged. It is isolated from the common output node during the driver input evaluation phase. During the next phase, the common output node is isolated from the driver input and the receiver output node is precharged.

Following the receiver output precharge phase, the input, i.e., the common output node of the driver(s), is evaluated. The receiver output is conditionally discharged as a function of the voltage level at the noded driver(s) output during the last phase of the multiphase clock cycle. The receiver output is then isolated until the next receiver precharge phase of the following clock cycle.

In one embodiment, the field-effect transistors are gated by major, i.e., double-phase clock signals. However, in a particular embodiment, both major and minor, i.e., single-phase clock signals, can be used in implementing a circuit embodiment.

Therefore, it is an object of this invention to provide an improved nodable driver and receiver circuit combination operated in accordance with a multiphase clock cycle.

Another object of this invention is to provide a multiphase circuit comprising one or more driver circuits on one or more semiconductor chips using a common output node as an input to a receiver circuit on the same or a different semiconductor chip.

A still further object of this invention is to provide a nodable four-phase field effect transistor driver and receiver circuit which can operate at a reasonable speed, without dissipating excessive power and without requiring relatively large field-effect transistor devices.

A still further object of this invention is to provide a multiphase field-effect transistor driver that can be noded with other drivers for operating at relatively high speeds within reasonable size and power requirements.

A further object of this invention is to provide a nodable four-phase transistor driver and receiver circuit using major-phase clock signals.

A still further object of this invention is to provide a receiver circuit having as an input a common output node from one or more driver circuits implementing a logic function wherein the gating time between the driver input and the receiver output is one logic bit time.

A still further object of this invention is to provide a noded four-phase driver-receiver circuit combination which eliminated charge splitting and in which inputs to the driver circuits are gated to a common output node which is then gated to the output of the receiver circuit within one logic bit time.

These and other objects of this invention will become more apparent when taken in connection with the description of the drawings, a brief description of which follows:

BRIEF DESCRIPTION OF DRAWINGS

The FIGURE is a schematic diagram of one embodiment of a four-phase driver-receiver circuit showing a plurality of drivers connected at a common output node for providing an input to a receiver circuit.

DESCRIPTION OF PREFERRED EMBODIMENT

The FIGURE is a schematic diagram of one embodiment of a driver 1 including other drivers (not illustrated) connected to common output node 2. Driver 1 is shown as having a single input on terminal 3. In other embodiments, one or more inputs may be provided. The particular embodiment shown implements a NOR gate function since any true input results in a false output at node 2. Capacitor 4, $C_o$, at the common output node 2 represents the inherent capacitance along the conductors and cables interconnecting the drivers at the common output node. In addition, capacitor 4 includes the inherent capacitance of the conductor and/or cable connecting the common output node 2 to the receiver 5. In a practical embodiment, the receiver 5 and driver circuits are on different semiconductor chips.

Field-effect transistor 8 has its drain electrode 39 connected to major phase clock signal $\Phi_{3+4}$ and its source electrode 10 connected to gate electrode 11 of field-effect transistor 12. Capacitor 13, $C_f$, is connected as a feedback capacitor between source electrode 10 and gate electrode 7 of field-effect transistor 8.

The source electrode 14 of field-effect transistor 12 is connected to electrical ground which represents a logic false state for the embodiment shown. The drain electrode 15 is connected to common output node 2 and to source electrode 16 of field effect transistor 17. The drain electrode 18 of field-effect transistor 17 is connected to supply voltage V which represents a logic true state for the embodiment shown. Actually the voltage is reduced by the threshold voltage drop through a field-effect transistor. The gate electrode 19 of field-effect transistor 17 is connected to clock signal $\Phi_{1+2}$.

The input to receiver 5 is designated by the numeral 20. As can be seen from the FIGURE, the input 20 and common output node 2 are electrically the same connection. The output of receiver 5 is designated by numeral 21.

The receiver 5 comprises series connected field-effect transistors 22 and 23 connected between the input and output terminals 20 and 21. The gate electrode 24 of field effect transistor 22 is connected to clock signal $\Phi_{4+1}$ and gate electrode 25 of field effect transistor 23 is connected to clock signal $\Phi_{3+4}$. The receiver 5 output node is designated by numeral 26. The pre-output node 26 is between field-effect transistors 22 and 23.

Field-effect transistor 27 is connected between pre-output node 26 and clock signal $\Phi_{2+3}$. The gate electrode 28 and drain electrode 29 are connected to common point 30 which in turn is connected to clock signal $\Phi_{2+3}$. The source electrode 31 is connected to pre-output node 26.

In the preferred embodiment, P-type MOS field-effect transistors, operating in an enhancement mode, implement the driver-receiver circuit. It should be pointed out that depletion-mode devices, N-type devices, MNOS devices, silicon-gate devices, and other field-effect transistors known to persons skilled in the art can also be used to implement the embodiment shown. In addition, a negative voltage level is used to designate a logic one or true state and electrical ground is used to designate a logic zero or false state. Other logic conventions are also within the scope of the invention.

In operation, field-effect transistor 6 is turned on during $\Phi_{1+2}$ so that the input appearing at terminal 3 is gated to the gate electrode of field-effect transistor 8. During $\Phi_{1+2}$, the $\Phi_{3+4}$ clock signal is false. That false signal level is gated to the gate electrode of field-effect transistor 12 and holds the field-effect transistor off at least during $\Phi_1$.

In one operating system, the input is unconditionally set true during $\Phi_1$ so that field-effect transistor 8 is turned on during $\Phi_1$. During $\Phi_2$, the input of prior stage (not shown) is evaluated so that input 3 may be conditionally discharged to electrical ground if the inputs to the preceding stage are true. In that case, the input 3 would change from true to false during $\Phi_2$.

For purposes of describing one example of operation, it is assumed that the input 3 remains true during $\Phi_2$. Therefore, at the end of $\Phi_2$, field effect transistor 6 is turned off and the charge on gate electrode 7 is isolated from input 3. At the beginning of $\Phi_{3+4}$, field-effect transistor 8 remains on and the true signal level of $\Phi_{3+4}$ is provided on the source electrode 10 and gate electrode 11 of field-effect transistor 12. The increased negative voltage level on source electrode 10 is fed back across feedback capacitor 13, $C_f$, for boosting the voltage on gate electrode 7. The boosted voltage on gate electrode 7 substantially enhances the conduction of field-effect transistor 8 so that the threshold loss across the transistor is reduced. As a result, substantially all of the $\Phi_{3+4}$ clock signal appears on the gate electrode 11.

Field-effect transistor 12 is turned on relatively hard, i.e., with increased conduction during $\Phi_3$ since the input 3 remained true during $\Phi_2$. When field-effect transistor 12 is on, the output node 2 is connected to electrical ground. Field-effect transistor 12 can be made relatively small and, therefore, dissipates lower power without increasing the voltage level at the output 2 when the transistor is on.

It is noted that field-effect transistor 17 was turned on during $\Phi_{1+2}$ by the application of the clock signal to the gate electrode 19 of the field-effect transistor. The common output node capacitor 4, $C_o$, was charged during $\Phi_{1+2}$ to approximately the supply voltage level, V. The supply voltage level was reduced by the threshold loss across transistor 17. Although it is possible to charge the common output capacitor $C_o$ during one clock interval, if a substantial number of drivers are connected at the common output node 2, more than one clock interval may be required to charge the relatively large inherent capacitance. For that reason, the gate electrode 19 is shown connected to a major-phase clock signal $\Phi_{1+2}$. For other application, it may be possible to use a minor phase clock signal at gate electrode 19 such as $\Phi_2$ if that clock signal is available.

Therefore, for the example assumed, the charged capacitance $C_o$ is discharged at the beginning of $\Phi_3$. Field-effect transistor 12 remains on also during $\Phi_4$ to provide an extra period of time during which capacitor $C_o$ can be discharged if required. As indicated in connection with field-effect transistor 17, in certain instances, it may be possible to use a minor-phase clock signal at the drain electrode 39 of field-effect transistor 8.

If the input 3 had been charged to electrical ground during $\Phi_2$, then field-effect transistor 8 would have remained off during $\Phi_{3+4}$. As a result, the capacitance 4, $C_o$, at common output node 2, would have remained charged during $\Phi_{3+4}$.

It is pointed out that the $\Phi_{1+2}$ phase of driver 1 is the output precharging phase. The $\Phi_{3+4}$ phase of driver 1 is the input evaluation phase. In other words, during $\Phi_{1+2}$, the output 2 is charged unconditionally to approximately the supply voltage V. During $\Phi_{3+4}$, the output is conditionally discharged as a function of the input signal stored on gate electrode 7 during $\Phi_{3+4}$.

During $\Phi_1$ of receiver 5, field-effect transistor 22 is held on by the $\Phi_{4+1}$ clock signal on its gate electrode. As a result, the inherent capacitance appearing at node 26 is at least partially charged during $\Phi_1$ which comprises part of the output precharge phase of driver 1. In other embodiments, where minor-phase clock signals are available, it may be more desirable to gate field-effect transistor 22 with a minor-phase signal such as $\Phi_4$. Charge-splitting between nodes is reduced by applying a voltage to each circuit node before the circuit nodes are connected together as part of the circuit operation.

At the end of the $\Phi_1$ phase, field-effect transistor 27 is turned on by the $\Phi_{2+3}$ clock to precharge node 26 if it had not already been precharged. In any case, the $\Phi_{2+3}$ clock signal voltage level completes the precharging of node 26 and supplies any leakage which might have occurred between $\Phi_1$ and $\Phi_2$. At the end of the $\Phi_2$ phase of the $\Phi_{2+3}$ clock, field-effect transistor 23 is turned on by the $\Phi_{3+4}$ clock signal on its gate electrode 25 for unconditionally precharging the output 21. At the end of $\Phi_3$, the $\Phi_{2+3}$ clock becomes false and field-effect transistor 27 is turned off. Field effect transistor 23 remains on during the $\Phi_4$ phase.

The field-effect transistor 22 is turned on during $\Phi_4$ by the clock signal $\Phi_{4+1}$ on its gate electrode 24. As a result, the common output node 2 is connected to the receiver 5 output 21. In effect, the $\Phi_4$ phase is the input evaluation phase of the receiver 5. The input to the receiver 5 is the common output 2 of the driver(s) illustrated by driver 1.

If capacitor $C_o$ stores a charge equivalent to a negative, i.e., true voltage level, the output 21 of receiver 5 remains charged during $\Phi_4$. If the output 2 is at electrical ground, however, the output 21 is discharged to electrical ground. It is pointed out that output 2 is false if field effect transistor 12 is on during $\Phi_4$ so that output 21 can be discharged through field-effect transistor 12 during $\Phi_4$. If field-effect transistor 12 had been turned off by $\Phi_4$ such as in another embodiment, the charge on the output 21 would have been divided for charging capacitor $C_o$ at common output node 2. In that case, the voltage at output 21 would be reduced. A change in the logic conventions would also be required.

It is pointed out, therefore, that the $\Phi_{2+3}$ phase of the receiver 5 indicates the precharge phases for node 26 and output 21. Specifically, $\Phi_2$ is the precharge phase for node 26 and $\Phi_3$ is the precharge phase for output 21. The $\Phi_4$ phase is the input evaluation phase for receiver 5. During $\Phi$4, the output remains charged or is discharged conditionally as a function of the voltage level on common output node 2. During $\Phi_1$, the cycle is repeated.

I claim:

1. A nodable multiphase field-effect transistor driver and receiver circuit comprising, an output, at least one field-effect transistor driver connected to said output including a first field-effect transistor for unconditionally setting said output to a first voltage level representing a first logic state during one phase of a multiphase clock cycle, and a second field-effect transistor for conditionally resetting said output to a second voltage level representing a second logic state during a second phase of said multiphase clock cycle as a function of the logic state of an input to said driver, a field-effect transistor receiver circuit including an output and having said first recited output connected as an input to said receiver circuit including, third and fourth field-effect transistors for precharging the receiver output during said second recited phase of said multiphase clock cycle, and a fifth field-effect transistor connected in electrical series with said fourth field-effect transistor between said receiver output and said first recited output, said third field-effect transistor is connected at a common point between said fourth and fifth field-effect transistors, said third field-effect transistor being conductive during said first recited phase for precharging the common point between said fourth and fifth field-effect transistors, said fourth and fifth field-effect transistors being operable during a subsequent phase of said multiphase clock cycle for connecting said receiver output to said first recited output.

2. The circuit recited in claim 1 including a plurality of field-effect transistor drivers connected at said output for implementing a logic function at an output node common to all of said drivers.

3. The circuit recited in claim 1 further including a sixth field-effect transistor connected between the gate electrode of said second field-effect transistor and the driver input, said sixth field-effect transistor being conditionally conductive as a function of the input state for controlling the voltage applied to the gate electrode of said second field-effect transistor at least during said second recited phase, said sixth field-effect transistor including a capacitor connected between one electrode and its gate electrode for feeding back the voltage on said one electrode to said gate electrode at least during said second recited phase for enhancing the conduction of said sixth field-effect transistor whereby the voltage on the gate electrode of said second field-effect transistor is increased, the other electrode of said sixth field-effect transistor being connected to a major-phase clock signal for rendering said sixth field-effect transistor conductive during said second recited phase and during said recited subsequent phase as a function of the logic state of an input signal to said driver.

4. The circuit recited in claim 3 wherein said multiphase clock cycle comprises four phases, said first recited output being unconditionally charged to a first voltage level at least during the second one of said four phases, said common point between said fourth and fifth field-effect transistors being charged to a voltage level simultaneously during said second phase, said first recited output being reset to said second voltage level as a function of the driver input during the third phase of said four-phase clock cycle, said receiver output being set to said first voltage level during said third phase, said receiver output being connected to said first recited output during the fourth phase of said four-phase clock cycle, said second field-effect transistor being conductive during said fourth phase as a function of the logic state of the input for enabling said receiver output to be reset to said second voltage level as a function of the logic state of said first recited output, the voltage on the gate electrode of said sixth field-effect transistor being unconditionally set to a first voltage level during the first phase of said four-phase clock cycle and conditionally reset to a second voltage level during said second phase of the four-phase clock cycle.

5. The circuit recited in claim 3 wherein said first field-effect transistor is gated by a first major-phase clock signal, said third field-effect transistor is gated by a second major-phase clock signal having one phase overlapping said first major-phase clock signal, said second and fourth field-effect transistors being gated by a third major-phase clock signal having one phase overlapping said second major-phase clock signal, said second field-effect transistor being gated by said third major-phase clock signal as a function of the logic state of an input to said driver, said fifth field-effect transistor being gated by a fourth major-phase clock signal having one phase overlapping said third major-phase clock signal.

* * * * *